(12) United States Patent
Davis et al.

(10) Patent No.: US 7,734,954 B2
(45) Date of Patent: Jun. 8, 2010

(54) METHOD, COMPUTER PROGRAM PRODUCT, AND SYSTEM FOR PROVIDING A MULTI-TIERED SNAPSHOT OF VIRTUAL DISKS

(75) Inventors: Kristan D. Davis, Rochester, NY (US); Thomas L. Haze, Pine Island, MN (US); Andrew T. Koch, Rochester, MN (US); Kyle A. Lucke, Oronoco, MN (US); Martin J. Thompson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 11/619,297

(22) Filed: Jan. 3, 2007

(65) Prior Publication Data

US 2008/0162843 A1 Jul. 3, 2008

(51) Int. Cl.
G06F 11/00 (2006.01)

(52) U.S. Cl. .................. 714/15; 707/204; 711/117; 711/162; 714/6

(58) Field of Classification Search .............. 707/200, 707/202, 204; 711/117, 162, 165; 714/6, 714/15
See application file for complete search history.

(56) References Cited

U.S. PATENT DOCUMENTS

| | | | | |
|---|---|---|---|---|
| 5,696,897 A * | 12/1997 | Dong | ........................... | 714/15 |
| 6,092,085 A * | 7/2000 | Keene | ........................ | 707/202 |
| 6,920,537 B2 * | 7/2005 | Ofek et al. | ................... | 711/163 |
| 6,965,976 B2 * | 11/2005 | Yamaguchi et al. | ......... | 711/162 |
| 7,062,624 B2 * | 6/2006 | Kano | ........................ | 711/165 |
| 7,107,395 B1 * | 9/2006 | Ofek et al. | ................... | 711/112 |
| 7,246,344 B1 * | 7/2007 | Christensen et al. | ........ | 717/109 |
| 7,328,364 B1 * | 2/2008 | Leong et al. | .................... | 714/6 |
| 7,363,549 B2 * | 4/2008 | Sim-Tang | .................... | 714/48 |
| 7,383,381 B1 * | 6/2008 | Faulkner et al. | ............. | 711/114 |
| 7,389,313 B1 * | 6/2008 | Hsieh et al. | .................. | 707/204 |
| 7,418,478 B1 * | 8/2008 | Orling et al. | ................ | 709/207 |
| 7,421,714 B1 * | 9/2008 | Orling et al. | ................ | 719/328 |
| 7,430,568 B1 * | 9/2008 | DeKoning et al. | .......... | 707/200 |
| 7,437,388 B1 * | 10/2008 | DeVos | ........................ | 707/204 |
| 7,441,096 B2 * | 10/2008 | Kitamura | .................... | 711/203 |
| 7,447,939 B1 * | 11/2008 | Faulkner et al. | ................ | 714/8 |

(Continued)

OTHER PUBLICATIONS

"System i Operating Systems", Nov. 17, 2006 http://222-03.ibm.com/systems/i/os/.

*Primary Examiner*—Robert Beausoliel
*Assistant Examiner*—Joshua P Lottich
(74) *Attorney, Agent, or Firm*—Cantor Colburn, LLP; James R. Nock

(57) ABSTRACT

An object in a tier of a multi-tier virtual storage system is saved while the storage system is active. The object to be saved in an upper-level tier in the multi-tier storage system is identified. Servers associated with lower-level tiers below the tier containing the object to be saved to obtain the latest data stored in the respective associated tiers, use temporary storage to store the obtained data and handle any modifications to the obtained data, and cause applications running in the respective tiers to quiesce. Once a copy of the identified object is made, the servers associated with the lower-level tiers are instructed to obtain the data from the temporary storage and resume quiesced applications running in the respective tiers.

20 Claims, 2 Drawing Sheets

U.S. PATENT DOCUMENTS

| | | | |
|---|---|---|---|
| 7,469,326 B1* | 12/2008 | Hardman | 711/162 |
| 7,519,870 B1* | 4/2009 | Sim-Tang | 714/48 |
| 7,613,890 B1* | 11/2009 | Meiri | 711/162 |
| 7,627,728 B1* | 12/2009 | Roeck et al. | 711/162 |
| 2003/0061456 A1* | 3/2003 | Ofek et al. | 711/162 |
| 2005/0204108 A1* | 9/2005 | Ofek et al. | 711/162 |
| 2005/0251540 A1* | 11/2005 | Sim-Tang | 707/202 |
| 2005/0267897 A1* | 12/2005 | D'Costa et al. | 707/100 |
| 2006/0212496 A1* | 9/2006 | Romine et al. | 707/204 |
| 2006/0282697 A1* | 12/2006 | Sim-Tang | 714/1 |
| 2007/0239944 A1* | 10/2007 | Rupanagunta et al. | 711/147 |
| 2007/0271304 A1* | 11/2007 | Atluri | 707/200 |
| 2007/0299959 A1* | 12/2007 | Penny et al. | 709/223 |
| 2008/0250086 A1* | 10/2008 | Kisley | 707/204 |
| 2010/0011178 A1* | 1/2010 | Feathergill | 711/162 |

* cited by examiner

METHOD, COMPUTER PROGRAM PRODUCT, AND SYSTEM FOR PROVIDING A MULTI-TIERED SNAPSHOT OF VIRTUAL DISKS

BACKGROUND

This invention relates generally to saving data in a storage space, in particular to saving data in a multi-tiered virtual storage space while the storage space is active.

Virtualization of storage allows a controlling operating system to carve out a large portion of the overall space to be allocated to a server. For example, on a system, such as an IBM system i5/OS®, large network server storage spaces can be created that are 1 terabyte in size and can be linked to a hosted operating system, like Linux, AIX, or Windows. The hosted operating system views this storage space as a single disk drive that can be partitioned and formatted like any other disk. This storage space can be saved and restored using an integrated operating system, since it is actually just a file accessible in the integrated file system.

However, to save this storage space while active requires the hosted operating system to be made aware that some higher level operating system needs to save the entire disk drive and to prepare for a backup. This means all data in cache needs to be written to disk. Once data on the disk is made consistent, a save-while-active process needs to take a snapshot of the object so no future write requests will affect the save and cause the data to be inconsistent. The save-while-active process uses a copy-on-write approach so only the data at the point of the "snapshot" will be saved.

The problem with this solution is that there is no process defined to prepare a hosted operating system for backup to allow the storage space to be saved safely and consistently. What makes this scenario even more difficult is if the hosted operating system also becomes a host to other operating systems using Microsoft virtual servers or using VMWare virtual servers. Since there is no way to safely save this storage space with consistent data, the only safe process to save a storage space, up to now, has been to have the hosted operating systems shut down so all data on the disk is consistent and will not change throughout the save.

SUMMARY

According to exemplary embodiments, a method, computer program product, and system are provided for saving an object in a tier of a multi-tier virtual storage system while the storage system is active. The object to be saved in an upper-level tier in the multi-tier storage system is identified. Servers associated with lower-level tiers below the tier containing the object to be saved are instructed to obtain the latest data stored in the respective associated tiers, use temporary storage to store the obtained data and handle any modifications to the obtained data, and cause applications running in the respective tiers to quiesce. Once a copy of the identified object is made, the servers associated with the lower-level tiers are instructed to obtain the data from the temporary storage and resume quiesced applications running in the respective tiers.

BRIEF DESCRIPTION OF THE DRAWINGS

These features and advantages of exemplary embodiments will be become further apparent to those skilled in the art from the following detailed description taken in conjunction with the accompanying drawings wherein.

DETAILED DESCRIPTION OF EXEMPLARY EMBODIMENTS

Figure 1:
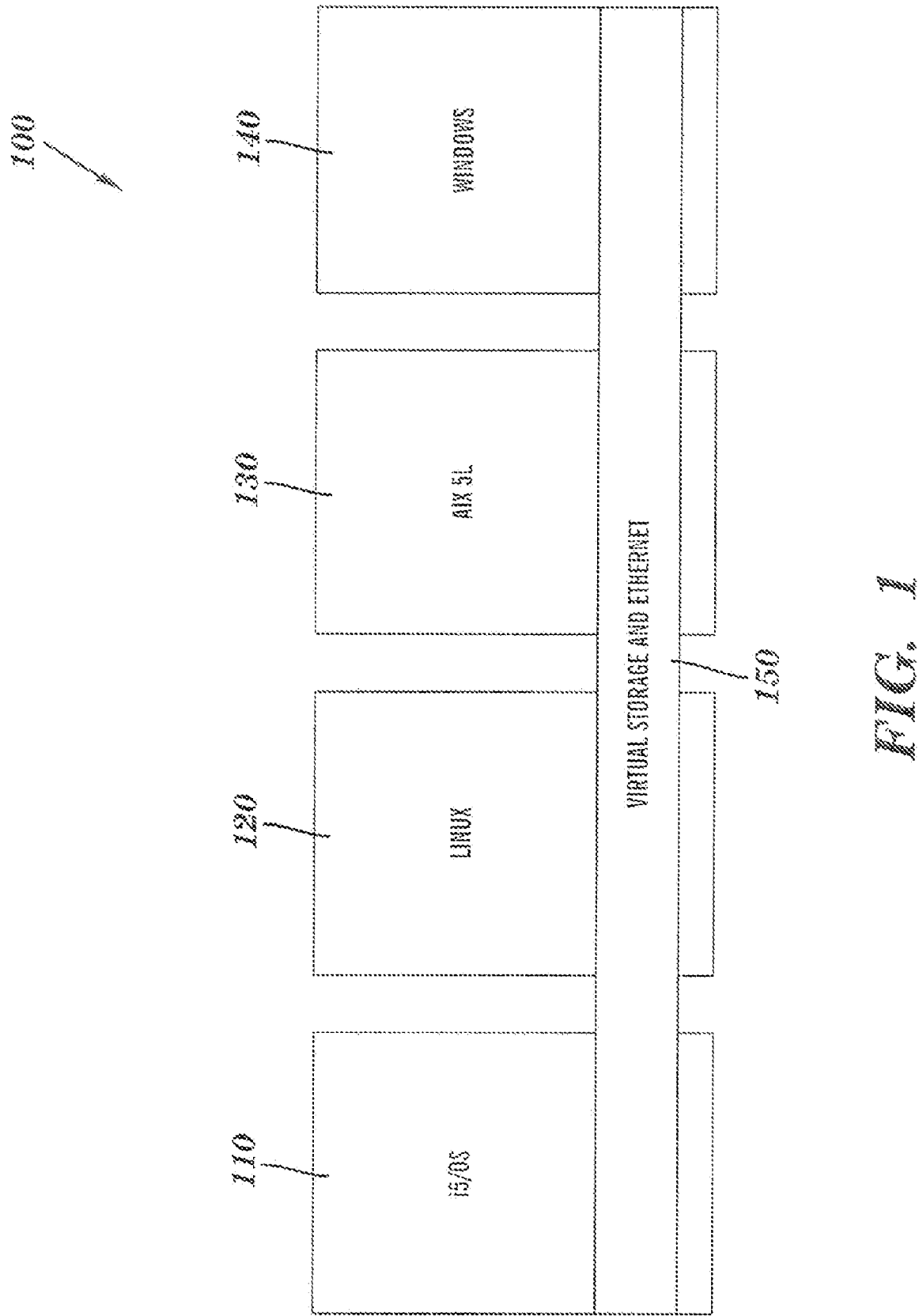
FIG. 1 illustrates an exemplary multi-tier storage system according to exemplary embodiments.

FIG. 1 illustrates an exemplary multi-tier storage system 100 according to exemplary embodiments. In such a system, one operating system hosts other operating systems. In the example shown in FIG. 1, the hosting operating system 110 is IBM's i5/OS®, and the hosted operating systems 120, 130, and 140 include Linux, IBM's AIX 5L™, and Microsoft Windows. However, it should be appreciated that there may be other operating systems capable of hosting multiple operating systems and that other operating systems may be hosted.

Referring to FIG. 1, the i5/OS® hosts operating systems including applications running on Windows, Linux, and AIX 5L™. The operating systems share virtual storage and Ethernet communications 150. This configuration eliminates complex architectures by creating an integrated system running over multiple, independently operated servers.

According to exemplary embodiment, when a server hosted by an operating system, such as i5/OS®, is created, the hosting operating system has ownership of the virtualized disk drives. These virtualized disk drives are referred to as storage space.

According to an exemplary embodiment, an end goal is to save the storage space that is in use by one of the hosted operating systems without interrupting the activity that is occurring on an operating system. According to exemplary embodiments, this is achieved by interaction between various components.

Saving an object while active requires the object to be put into a state where a checkpoint can be made so any future updates to the object are not included on the save media. According to an exemplary embodiment, a technique is provided for obtaining a "snapshot" of an object that is in use by integrated virtual servers. This is called a multi-tiered snapshot because it requires interaction between multiple layers of operating systems to achieve this safe and consistent snapshot. This technique allows a storage space to be saved while active, which improves availability of servers and increased usefulness of objects during disaster recovery.

The following example demonstrates how various operating system layers may be layered such that a multi-tiered snapshot may be useful. In this example, a top tier (1) may include a shark storage system with a vast amount of disks partitioned for i5/OS®. A second tier (2) may include i5/OS®, using the shark storage, containing a large storage space that is linked to a *GUEST i5/OS partition. That i5/OS partition contains a storage space in a third tier (3) attached to a Windows server. On that Windows server, VMWare is installed in a fourth tier (4). On the VMWare disk, Linux is installed in a fifth tier (5). On Linux, there are many volumes of data in a sixth tier (6).

The process to save a virtual disk starts at some level where the object being saved is on a virtual disk drive or storage space. This level does not need to be the top most tier. At any one of the levels above the level where the object is being saved, data may be saved that can be restored. However, the only way to ensure the data in, say, tier 2 can be safely saved is to work down the tree of tiers to request the lower operating systems to put their applications into a "freeze" state to ensure a consistent snapshot can be achieved. Therefore, a snapshot of storage in tier 2 cannot be taken until storage in tier 3 is ready for the snapshot. And, of course, storage in tier 3 cannot be ready until storage in tier 4 is prepared for backup, and so on.

The process for saving an object in this manner may be done in two phases that flow down the tree. The two phases may be referred to as a Freeze phase and a Thaw phase. If saving an object in storage space 2, a snapshot of that object needs to be taken so the copy-on-write method can be used. Therefore, a request needs to be sent to servers using storage space 2 to Freeze momentarily.

Since Windows in the example above is using storage space (tier) 3 and is told to Freeze, it needs to send a request to VMWare requesting it to Freeze storage space (tier) 4, and so on. To "Freeze" means that any applications using the disk obtain the latest data stored by those applications, and the disk driver starts using temporary storage for write requests until told it can Thaw.

After each OS has completed the Freeze phase, a message is returned up the tree to the calling process, letting the calling process know the operating systems have prepared for backup. Once the top-most tier has been notified that the storage space is ready for backup, the copy-on-write method is enabled. Now, it is time to Thaw the applications that were frozen with another request sent down the tree. The Thaw phase lets the device drivers synchronize their write requests that were stored into temporary storage on the virtual disk that is being saved. The operating systems continue to run as normal, since the top-most tier is using a copy on write method to track any changes to the disk while it is being saved.

Figure 2:
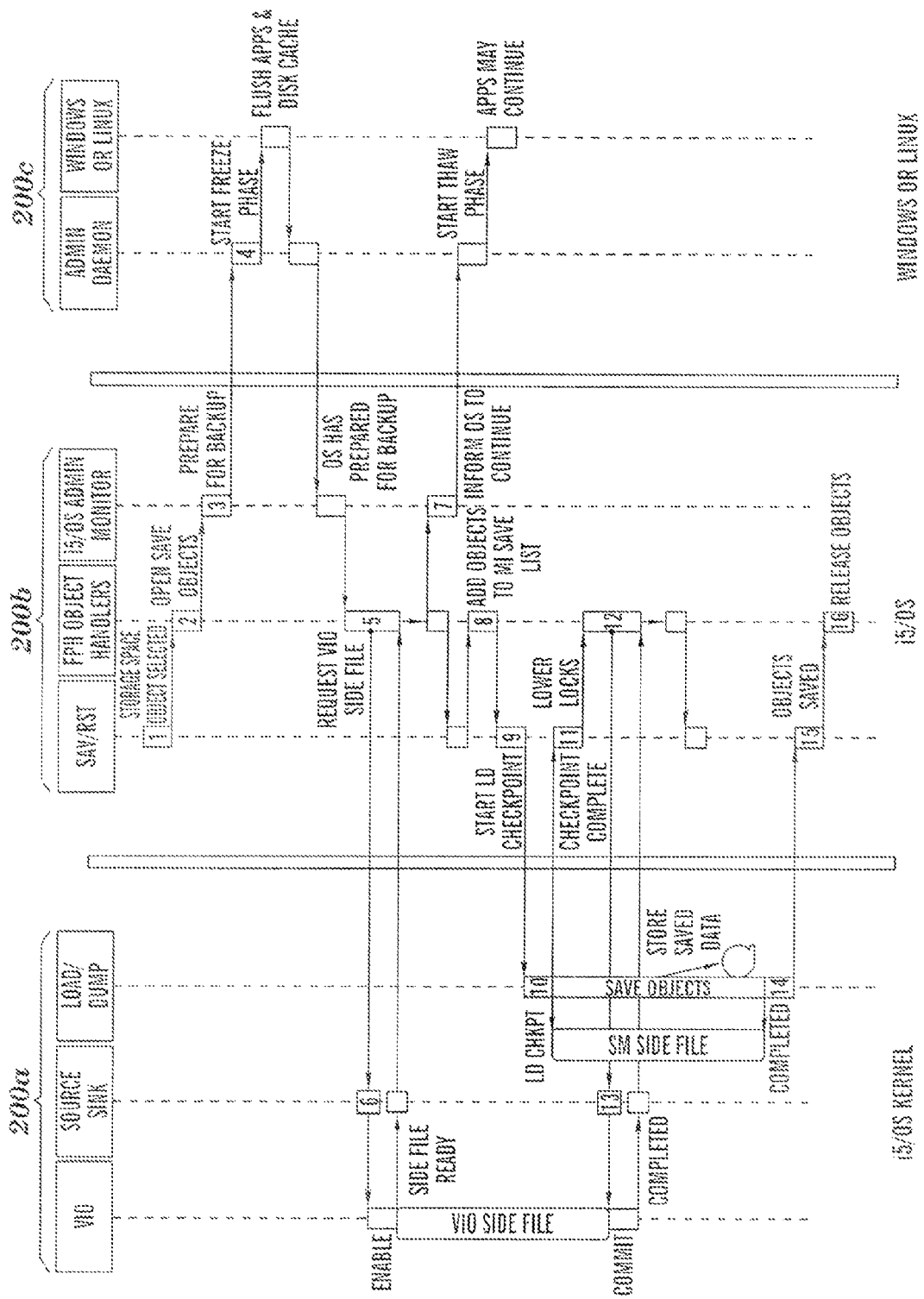
FIG. 2 illustrates the flow of instructions between different components of a multi-tier storage space according to exemplary embodiments.

FIG. 2 illustrates the flow for a two-tiered snapshot, where the hosting operating system is i5/OS®, and the hosted operating system includes Windows or Linux. It should be appreciated that the specific components depicted in FIG. 2 are shown for illustrative purposes and that any suitable components may be used as appropriate for the various levels of the multi-tier storage system.

Referring to FIG. 2, there are three sections 200a, 200b, and 200c, labeled i5/OS kernel, i5/OS, and Windows or Linux, respectively. The i5/OS kernel level program on the system includes various components. In FIG. 2, for illustrative purposes, there are three components shown that run in the i5/OS kernel: VIO, Source Sink, and Load/Dump. The VIO is the code that manages input and output of virtual disk devices. When a Windows application wants to read or write data on its virtual disk drive, VIO knows the actual location at which to store that data on the physical disk drives. The Source Sink has the ability to send and receive requests about the server between the i5/OS kernel and the hosting operating system, e.g., i5/OS®. Therefore, when a component in i5/OS® needs to have VIO perform a task, a server object is updated with the appropriate request code, which will be sent to VIO as a request message to start using the side file or to stop using the side file. The Load/Dump portion refers to code that sends the data directly to the tape drive for backup and reads the data from the tape drives during restores. It receives pointers to objects selected for backup from SAV/RST and reads from that address location until the object has been fully written to tape.

I5/OS is the primary operating system that runs on the IBM System i. Some of the components shown for illustrative purposes as being included in I5/OS are SAV/RST, FPH Object Handler, and i5/OS Admin Monitor. The SAV/RST is the code that give users the ability to select the object that needs to be saved or restored on i5/OS®. Since the virtual disk drives are actually files in the integrated file system, these storage spaces can be saved with the SAV command. The FPH Object Handler performs special tasks before SAV/RST saves the object by initiating the Freeze and Thaw actions. The FPH Object Handler is only involved when a user requests to save a storage space. The i5/OS Admin Monitor is a program that is started when an integrated Windows or Linux server is started. It provides a method of communication with the server across the Virtual Ethernet connection to allow management of the server from the i5/OS®.

The Windows/Linux portion is the integrated server that is running on a system x, BladeCenter, or system i Logical partition. This portion includes an Admin Daemon that is a server program that starts whenever Window or Linux starts and connects to the i5/OS Admin Monitor. It takes requests from the Admin Monitor to perform many tasks, like creating users, retrieving CPU statistics, and retrieving disk statistics. According to an exemplary embodiment, the Admin Daemon takes requests to prepare the disk for backup. The Windows or Linux subportion has its own method for preparing for backup. The Windows method includes a Volume Shadow-copy Service (VSS), which allows a backup application to request all active application to write data in memory out to disk. This is important when saving the virtual disk drive to ensure the data being saved is complete and consistent. Similarly, the Linux method includes a request for applications to write their data to disk. It is referred to as the "SYNC" command.

Referring again to FIG. 2, at step 1, a user requests a save of the storage space object '/QFPNWSSTG/STGNAME'. The FPH Object Handler is notified of the save request. The FPH Object Handler opens the storage space with read only access at step 2. If the disk selected for save is not actively being used, then no notification is necessary to ensure this disk can be saved while active, and the flow jumps directly to step 8, explained in detail below. Otherwise, a request is sent to the Admin Daemon on the integrated server, requesting the server to prepare for backup, at step 3. For Windows or Linux servers, the Admin Monitor attempts to send an envelope to the admin service requesting the server to prepare to backup and Freeze write requests.

At step 4, the Freeze phase is started as follows. The admin service running on Windows or Linux accepts the envelope and proceeds as follows. For Windows Server 2003, Microsoft has added functionality for backup applications to request applications to get into a consistent state on disk. This is done using API calls to the Volume Shadow-copy Service. The method used to get applications to flush their data to disk is called "prepare for backup". For a Linux (or AIX) server, the admin service may perform a 'SYNC' request to flush cache to disk, but since applications may still have data that is in memory, applications should be "quiesced", that is, put into a temporarily inactive or inhibited state, to ensure that the latest file data is stored to disk.

The Freeze exit program gets called to perform other necessary tasks to quiesce applications that do not participate in a Sync or VSS request. This may include notifying underlying operating systems to Freeze, halting other applications, start journaling database transactions, or any other task that needs to be performed. The Freeze status of the lower tier is received to ensure the server is ready for backup. The storage manager is notified to start using a temporary location for any write requests until the copy-on-write is enabled (steps 5 and 6).

Next, the admin service running on the Windows or Linux integrated server is notified to Thaw applications (at step 7). The Thaw exit program gets called to perform any tasks to inform underlying operating systems to Thaw, restart quiesced applications, and continue any transactions. All objects in the complex object are added to the request descriptors (at step 8) and are ready for back up at this point. Save/Restore has the updated list of objects to process in an object descriptor and requests Load/Dump to get a checkpoint on specified objects (at step 9). Load Dump gets a checkpoint on all objects in the save list and immediately starts saving the objects and storing the data to media (step 10). The Save application notifies the FPH Object Handler to lower locks on objects that were requested for backup at step 11. This means that the objects have been check pointed by Load/Dump. The copy-on-write method is now enabled so temporary storage is not longer needed. Any write requests need to be committed to storage. The storage manager is notified to synchronize all changes to disk (steps 12 and 13). Eventually, all objects selected for backup will be completely saved, and the side file used for copy-on-write method will be thrown away (step 14). Finally, the save application notifies the FPH Object Handler to cleanup and release any locks on the storage space (steps 15 and 16).

Although these steps described the process being used for a specific implementation, the steps can be rewritten to be more generic to fit other virtual servers and virtual disks.

As described above, exemplary embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for saving an object in a tier of a multi-tier virtual storage system while the storage system is active, comprising:
   identifying an object to be saved in an upper-level tier in the multi-tier virtual storage system, wherein the multi-tier virtual storage system resides on one or more physical storage devices;
   instructing servers associated with lower-level tiers below the tier containing the object to be saved to obtain the latest data stored in the respective associated tiers, use temporary storage to store the obtained data and handle any modifications to the obtained data, and cause applications running in the respective tiers to quiesce;
   making a copy of the identified object; and
   instructing the servers associated with the lower-level tiers to obtain the data from the temporary storage and resume quiesced applications running in the respective tiers.

2. The method of claim 1, wherein the step of instructing servers associated with the lower-level tiers to cause the applications in the respective tiers to quiesce includes temporarily halting operation of the applications.

3. The method of claim 1, wherein the step of instructing the servers associated with the lower-level tiers to obtain data from the temporary storage includes instructing the servers associated with the lower-level tiers to synchronize write requests that were stored into temporary storage on the virtual disk being saved.

4. The method of claim 1, wherein tiers above the tier containing the object to be saved continue to read and write data to storage without interruption.

5. The method of claim 1, wherein the multi-tier virtual storage system is shared by multiple operating systems.

6. The method of claim 5, wherein the multiple operating systems include a hosting operating system and one or more hosted operating systems.

7. The method of claim 6, wherein the operating system communicate via an Ethernet layer.

8. A computer program product for saving an object in a tier of a multi-tier virtual storage system while the storage system is active, the computer program product comprising a computer readable storage medium having a computer readable program, wherein the computer readable program, when executed on a computer, causes the computer to:
   identity an object to be saved in an upper-level tier in the multi-tier storage system;
   instruct servers associated with lower-level tiers below the tier containing the object to be saved to obtain the latest data stored in the respective associated tiers, use temporary storage to store the obtained data and handle any modifications to the obtained data, and cause applications running in the respective tiers to quiesce;
   make a copy of the identified object; and
   instruct the servers associated with the lower-level tiers to obtain the data from the temporary storage and resume quiesced applications running in the respective tiers.

9. The computer program product of claim 8, wherein causing the applications in respective lower-level tiers to quiesce includes temporarily halting operation of the applications.

10. The computer program product of claim 8, wherein as part of causing the computer to instruct the servers associated with the lower-level tiers to obtain data from the temporary storage, the computer readable program causes the computer to instruct the servers associated with the lower-level tiers to synchronize their write requests that were stored into temporary storage on the virtual disk being saved.

11. The computer program product of claim 8, wherein tiers above the tier containing the object to be saved continue to read and write data to storage without interruption.

12. The computer program product of claim 8, wherein the multi-tier virtual storage system is shared by multiple operating systems.

13. The computer program product of claim 12, wherein the multiple operating systems include a hosting operating system and one or more hosted operating systems.

14. The computer program product of claim 13, wherein the operating systems communicate via an Ethernet.

15. A multi-tier virtual storage system, comprising:
multiple tiers containing data associated with multiple respective servers, wherein the multi-tier virtual storage system resides on one or more physical storage devices; and
a virtual storage space and Ethernet layer enabling communication between the tiers, wherein when an object to be saved in an upper-level tier in the multi-tier storage system is identified, servers associated with lower-level tiers below the tier containing the object to be saved obtain the latest data stored in the respective associated tiers, use temporary storage to store the obtained data and handle any modifications to the obtained data, and cause applications running in the respective tiers to quiesce; and
a file for making a copy of the identified object, wherein once the identified object is copied, the servers associated with the lower-level tiers obtain the data from the temporary storage and resume quiesced applications running in the respective tiers.

16. The system of claim 15, wherein the applications in the lower-level tiers quiesce by temporarily halting operation.

17. The system of claim 15, wherein the servers associated with the lower-level tiers synchronize their write requests that were stored into temporary storage on the virtual disk being saved when obtaining data from the temporary storage.

18. The system of claim 15, wherein tiers above the tier containing the object to be saved continue to read and write data to storage without interruption.

19. The system of claim 15, wherein the multi-tier virtual storage system is shared by multiple operating systems.

20. The system of claim 19, wherein the multiple operating systems include a hosting operating system and one or more hosted operating systems.

\* \* \* \* \*